(No Model.)
B. S. LAWSON.
ROLLER BEARING.
No. 572,681. Patented Dec. 8, 1896.
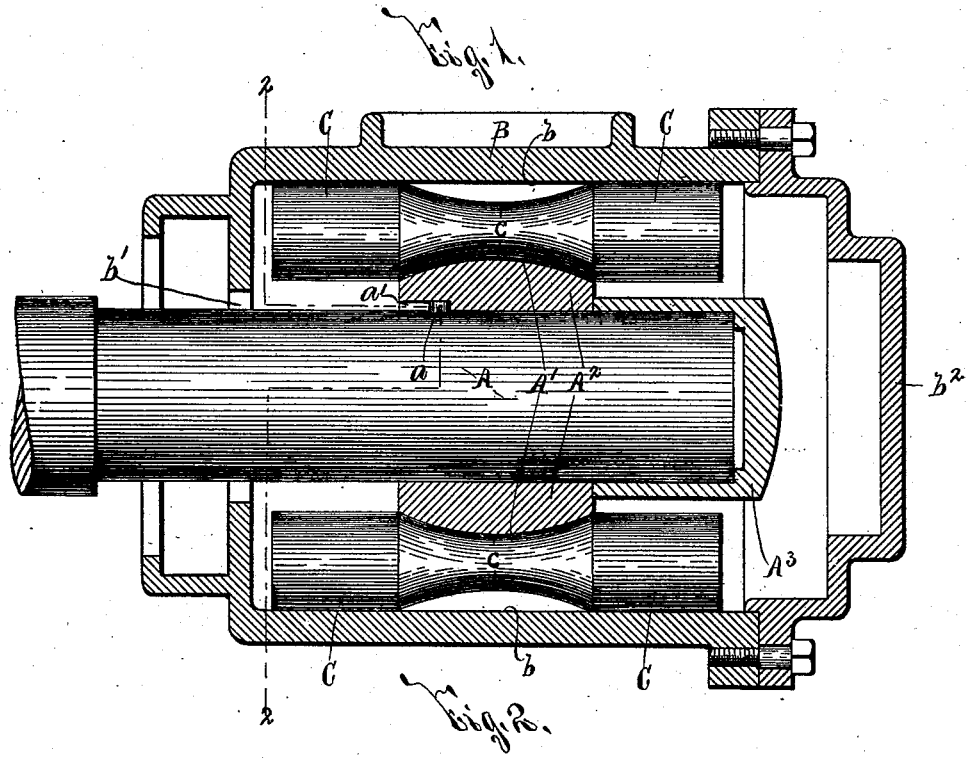
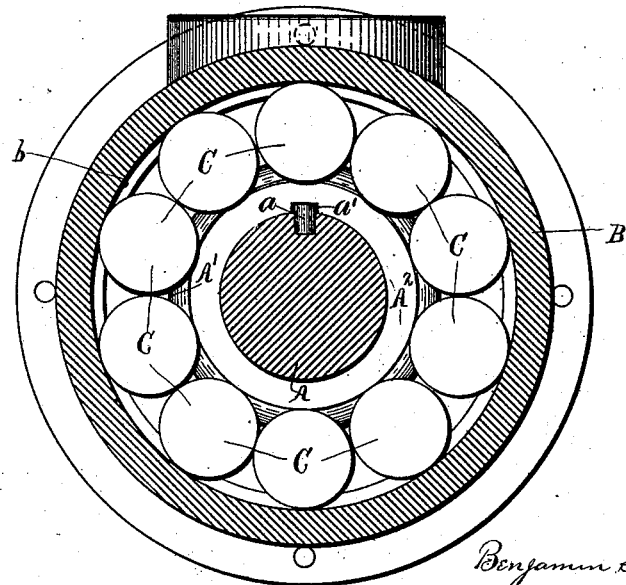
WITNESSES:
INVENTOR
Benjamin S. Lawson
BY
Hey & Parsons
ATTORNEYS

UNITED STATES PATENT OFFICE.

BENJAMIN S. LAWSON, OF RED BANK, NEW JERSEY, ASSIGNOR TO THE ROLLER-BEARING TRUCK COMPANY, OF NEW YORK, N. Y.

ROLLER-BEARING.

SPECIFICATION forming part of Letters Patent No. 572,681, dated December 8, 1896.

Application filed September 27, 1895. Serial No. 563,822. (No model.)

*To all whom it may concern:*

Be it known that I, BENJAMIN S. LAWSON, of Red Bank, in the county of Monmouth, in the State of New Jersey, have invented new and useful Improvements in Roller-Bearings, of which the following, taken in connection with the accompanying drawings, is a full, clear, and exact description.

This invention relates to improvements in roller-bearings, and has for its object the production of a device which reduces to a minimum the friction and binding incidental to the revolution of an axle or shaft in a bearing; and to this end it consists, essentially, in the construction and arrangement of the component parts of the bearing, all as hereinafter more particularly described, and pointed out in the claims.

In describing this invention reference is had to the accompanying drawings, forming a part of this specification, in which like letters indicate corresponding parts in both the views.

Figure 1 is a longitudinal vertical section, partly in elevation, of a bearing embodying my invention; and Fig. 2 is a transverse vertical section taken on line 2 2, Fig. 1.

As is well known, various forms of roller-bearings have been devised, in some of which the rollers are grooved for receiving a rib projecting from the inner face of the casing, and are so arranged and proportioned that their extremities roll in contact with the axle or shaft and out of contact with the inner face of the casing. In bearings of this construction the rollers tend to incline toward the axis of the axle or shaft and cause more or less friction and binding of the parts, and consequently dividers are necessitated for holding the rollers apart. Such dividers are soon materially worn, retard the action of the rollers, generate more or less friction, and are a source of constant annoyance and expense. These bearings, although somewhat similar to my invention, are radically different therefrom, as the rollers of my bearing do not tend to incline toward the axis of the axle or shaft, and are so arranged as to roll in contact with each other without necessitating the use of a divider.

A is a suitable axle or shaft, B the outer casing of my improved bearing, and C C rollers interposed between the axle or shaft and the outer casing.

The axle or shaft A is provided with a peripheral bearing-face A', which preferably projects therefrom, and is usually formed convex in cross-section. In the preferable construction of my bearing this face, instead of being formed directly upon the shaft, consists of the outer face of a sleeve or support $A^2$, which may be fixed to the axle or shaft in any desirable manner, although it is usually detachably secured thereto by any suitable means, as a cap $A^3$ upon the outer end of the axle or shaft and a pin or shoulder $a$, projecting from said axle into a groove $a'$, opening from the inner edge of said sleeve.

The outer casing B is formed with an inner circular bearing-face $b$, preferably of flat cross-section, and an aperture $b'$, extending through its inner side for permitting the entrance of the axle or shaft A, and may be provided with means, (not illustrated,) as shown in my pending application, Serial No. 564,626, for preventing entrance of dust. The opposite end of the casing B is provided with a removable cap $b^2$, which, if desired, may support a suitable thrust-bearing, (not illustrated,) as shown in my pending application, Serial No. 564,626, for holding the sleeve $A^2$ in position and preventing endwise movement of the axle or shaft.

The rollers C loosely contact with each other, and are formed at their central portions with contracted peripheral bearing-faces $c$, which are preferably concave in cross-section and roll in contact with the face A' of the axle or shaft A. The opposite extremities of the rollers C roll in contact with the inner face $b$ of the casing B and out of contact with the axle or shaft A.

In the operation of my improved bearing the rollers C are free to automatically adjust themselves on the bearing-face engaged by their central portions, and are maintained in alinement with the axis of the axle or shaft A, and consequently the axle or shaft journaled in said bearing revolves with a minimum degree of friction and binding. Moreover, as the rollers, the sleeve, and the casing can be readily and economically hardened my invention is particularly durable.

My improved bearing will now be readily understood upon reference to the foregoing description and the accompanying drawings, and, as it will be apparent that the exact detail construction and arrangement of its component parts may be considerably varied without departing from the spirit of my invention, I do not herein specifically limit myself thereto.

Having thus fully described my invention, what I claim as new, and desire to secure by Letters Patent, is—

1. In a roller-bearing, the combination with an axle or shaft provided with a peripheral engaging face formed convex in cross-section; of an outer casing, and independently-adjustable antifriction-rollers interposed between the axle or shaft and the outer casing, and having their peripheral faces free to roll in contact with each other, said rollers having their extremities rolling in contact with the inner face of the casing and out of contact with the axle or shaft, and their central portions rolling in contact with said engaging face and out of contact with the inner face of the casing, substantially as described.

2. In a roller-bearing, the combination with an axle or shaft provided with a projecting peripheral engaging face formed convex in cross-section; of an outer casing, and independently-adjustable antifriction-rollers interposed between the axle or shaft and the outer casing and having their peripheral faces free to roll in contact with each other, each of said rollers being formed with a contracted substantially central portion formed with a concave peripheral face engaged with said projecting peripheral face and separated from the inner face of the outer casing, and each of said rollers having its extremities engaged with the inner face of the casing and separated from the axle or shaft, substantially as specified.

3. In a roller-bearing, the combination with an axle or shaft provided with a projecting pin or shoulder, a sleeve mounted on the axle or shaft and having its inner peripheral face formed with a groove for receiving the pin or shoulder and its outer peripheral face formed convex in cross-section, and a cap mounted on the axle or shaft for engaging the sleeve and holding the same in its normal position; of an outer casing, and independently-adjustable antifriction-rollers having their central portions rolling in contact with the outer peripheral face of the sleeve, and their extremities rolling in contact with the inner face of the outer casing, substantially as and for the purpose set forth.

In testimony whereof I have hereunto signed my name, in the presence of two attesting witnesses, at Syracuse, in the county of Onondaga, in the State of New York, this 23d day of September, 1895.

BENJAMIN S. LAWSON.

Witnesses:
E. A. WEISBURG,
K. H. THEOBALD.